Patented Feb. 27, 1940

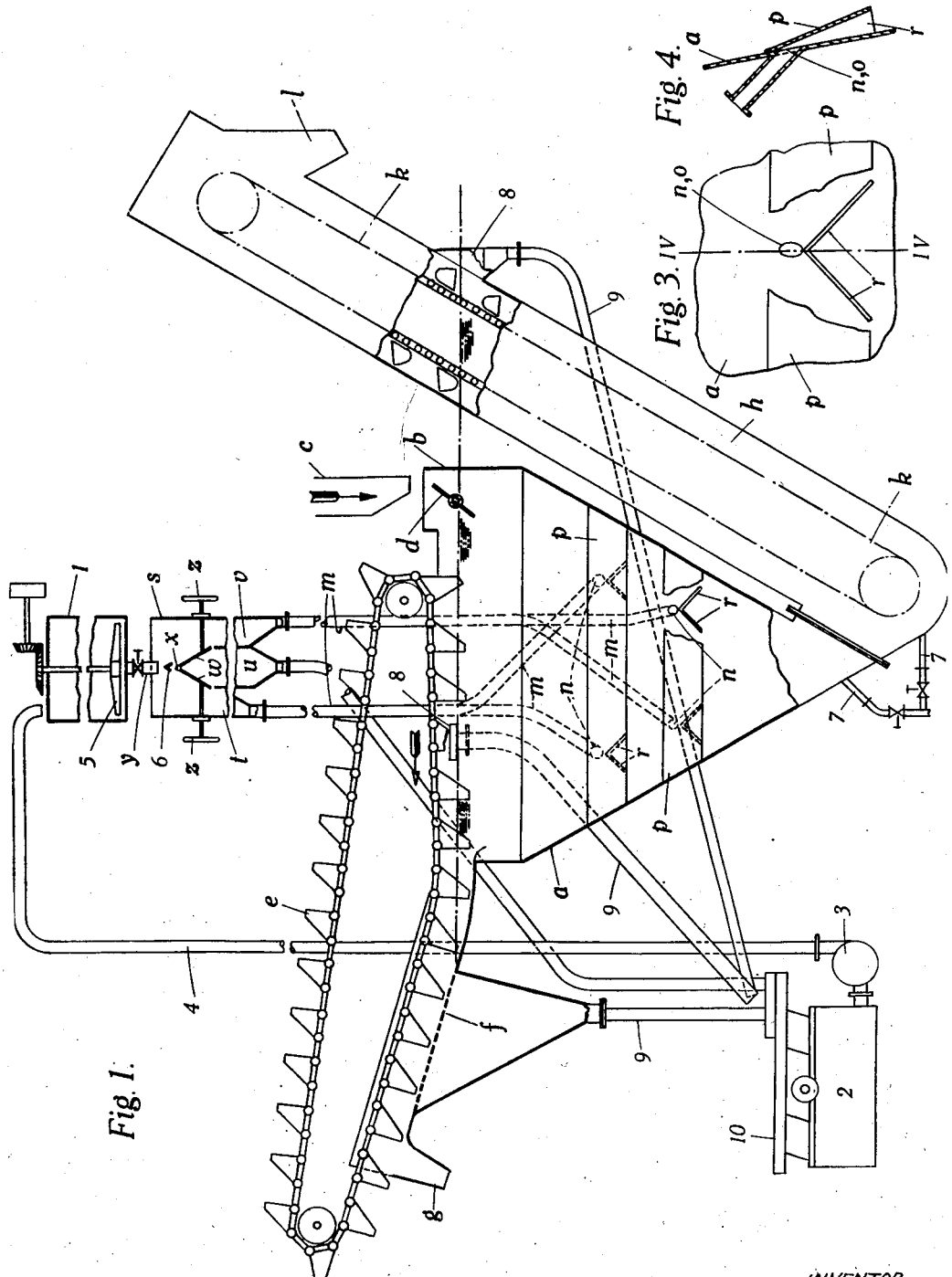

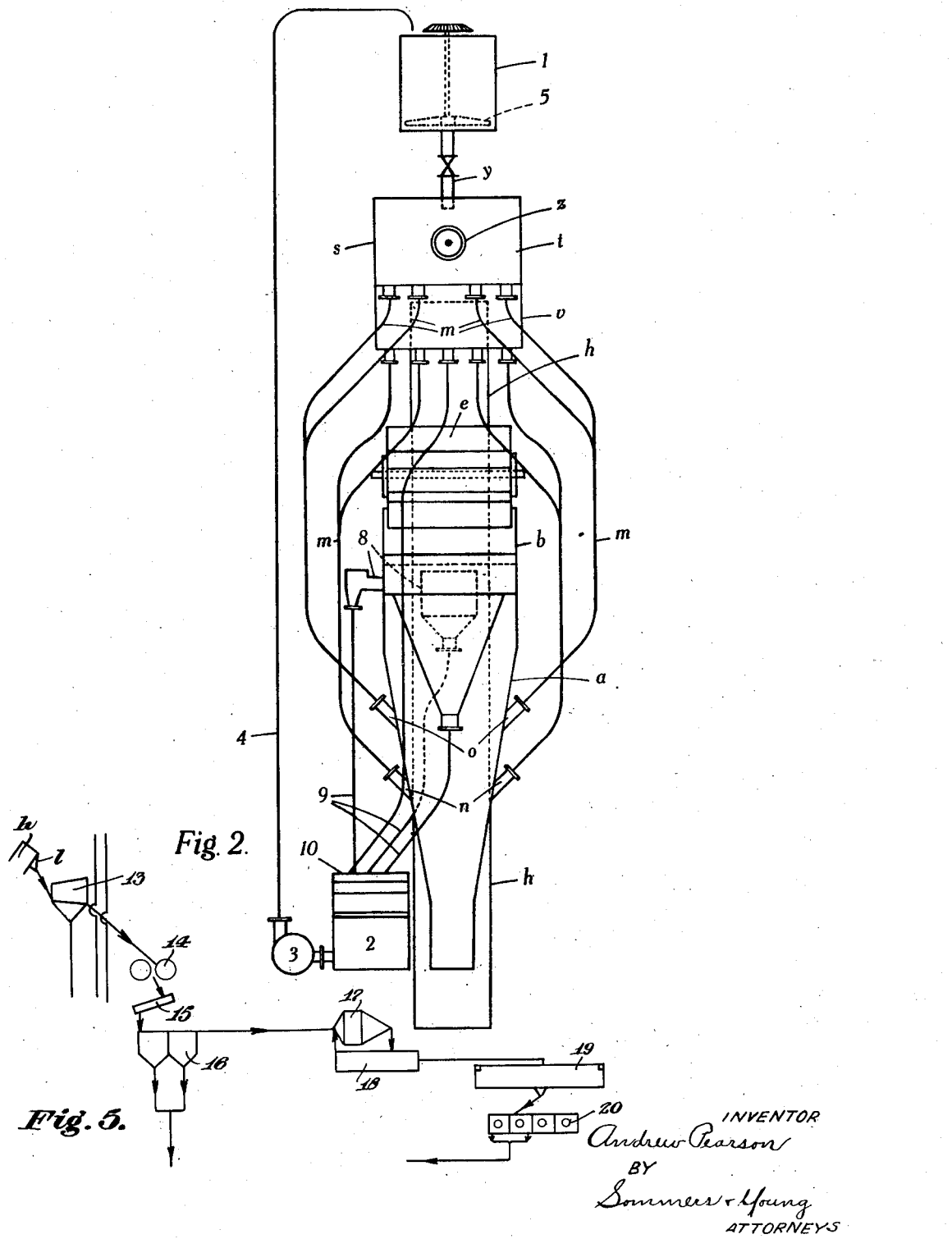

2,191,805

UNITED STATES PATENT OFFICE 2,191,805

SEPARATION OF SOLID MATERIALS OF DIFFERENT SPECIFIC GRAVITIES

Andrew Pearson, Aldwych, London, England, assignor to Huntington, Heberlein & Company, Limited, Aldwych, London, England, a British joint-stock company Application November 24, 1937, Serial No. 176,365
In Great Britain December 8, 1936

5 Claims. (Cl. 209—173)

This invention comprises improvements in or relating to methods and apparatus for the separation of solid materials of different specific gravities according to the sink-and-float principle, using a so-called heavy liquid which divides the solid materials into a fraction which floats and a fraction which sinks.

Under the term "heavy liquid" is included any fluid medium heavier than water and suitable for effecting separation according to the principle referred to. In carrying out the invention it is suitable, for example, to employ a solution, such as calcium chloride solution, or a suspension such as an aqueous suspension of clay and barytes or of galena and talc or other stabilizing medium. The invention is applicable to the treatment of various materials and notably for separating ores, for example, copper, lead, zinc, tungsten, pyritic gold ores and so on, from their gangue or tailings and cleaning coal from stone.

A well-known form of apparatus for sink-and-float separation comprises a separating vessel tapered towards its lower end, where it has an outlet for sink material connected with the casing of a discharge device such as an elevator or bucket or drag conveyor. The materials for treatment are fed to the upper part of the body of heavy liquid and the float material is removed horizontally by suitable means such as a reciprocatory or continuous rake device while the sink material is elevated from the bottom of the vessel by the aforesaid discharge device.

In practice, it has been found that the efficiency of the separating system, particularly in the case of ore concentration, is definitely and adversely affected by uncontrollable cross or downward currents which hinder free settling conditions within the body of separating liquid. Currents of this nature are induced by fall of the heavier particles through the liquid and generally accompanying horizontal discharge of the float material and also the discharge of the sink material. They may also be caused by the supplies of heavy liquid introduced for make-up or other purposes as these have usually been introduced laterally into the separating vessel.

It has also been found that, when using suspensions as separating media, the sink material exerts downward drag on the heavier particles of the media and this induces settlement which decreases the stability of the suspensions.

Suggestions have heretofore been made to provide inlets for heavy liquid at various points on the separating vessel in order to set up a small upward current, or slight upward and downward currents, in the body of heavy liquid, for the purpose of increasing the proportion of float material or of accelerating or improving the separation of the light and heavy particles.

The principal object of the present invention is to provide an improved float-and-sink separating apparatus adapted to influence the body of heavy liquid in such a manner that current shall move therein substantially entirely in an upward direction and thus neutralize or overcome cross currents and preserve the stability of suspensions.

The intention in regard to such current is not that it shall act in the manner of the classifying current in hydraulic classifiers, which do not operate according to the sink-and-float principle, but solely to counteract any tendency for irregular movements within the body of heavy liquid in sink-and-float practice, by converting all movement of the liquid in the separating vessel into gentle movement in one direction in which it can be controlled within narrow limits.

A current of upward nature is of considerable value in attaining the end desired as it can be readily set up as well as easily controlled, but it will be apparent that its influence must extend not only to the upper part but also to the lower part of the body of heavy liquid throughout the entire separating zone of the liquid, in order to attain the desired results, and that it should operate over substantially the whole cross-section of the body of liquid.

In order that separation shall be as nearly as possible in accordance with the specific gravities of the material alone and that the size of the material shall be substantially without effect in the separation, the body of liquid should be as nearly as possible free of disturbing currents, that is, it should be in quiescent condition. The gentle upward movement of the body of liquid is not a disturbing influence, but, on the contrary, has the effect of eliminating or reducing disturbing currents and other effects caused by fall of the heavy material through the liquid.

According to this invention, apparatus for the separation of solid materials of different specific gravities by the sink-and-float method, comprises a separating vessel provided with inlets for heavy liquid at a plurality of levels below the feed inlet for solid materials, and means for continuous supply of heavy liquid to such inlets, the series of levels extending to the lower part of the vessel and the inlets being adapted to give a horizontally distributed supply of the liquid to the vessel.

By this construction, the liquid entering the inlets is able to operate substantially uniformly throughout the depth and cross-section of the body of liquid and predominant upward current conditions are imposed which effectively counteract deleterious cross-currents and downward drag of heavy particles of suspensions.

It is of advantage to provide inlets in several rows and to dispose rows on opposite sides of the separating vessel. Any tendency for the pressure of the current to fall off owing to the gradually increasing cross-section of tapering separating vessels can be effectively avoided by using an appropriate number or arrangement of inlets in the different rows. In order further to provide for uniform distribution of the heavy liquid supply spreading devices may be disposed over the inlets. These spreading devices may comprise shrouds or plates extending from the walls of the separating vessel at a downward slope, so as to direct the liquid favourably and at the same time avoid or minimize possible settlement of sink material upon them.

In order to provide a difference of head of the heavy liquid with respect to the surface of the separating body of liquid to assist in regulating the quantity added at the several levels in accordance with the increase of cross-section at the respective levels, it is advantageous to feed the respective levels from different liquid columns. This can be attained by feeding the heavy liquid or suspension to the inlets from a tank or casing arranged above the separating vessel and provided with compartments at different levels. As a result the heavy liquid is enabled in a very simple manner to enter the inlets at all levels at the pressure necessary to introduce the required quantity of liquid.

According to another feature of the invention, a distributing device or valve for controlling the supply of heavy liquid to the inlets comprises a swingable plate device adapted to deflect the liquid or suspension to receptacles connected with the inlets. For example, this device may be adjusted to direct the liquid in appropriate quantities to the different compartments of the aforesaid tank or casing. Ordinary cock-type valves present a disadvantage in that material suspended in the heavy liquid is likely to clog them. This is avoided by the present distributing valve device as the liquid can discharge from an open pipe on to the swingable plate device and the latter deflect the liquid to the aforesaid vessels or compartments without possibility of clogging or accumulation of suspension solids.

For the purpose of maintaining desired density and viscosity of the body of heavy liquid, it is the practice to guard against thickening, due to absorption in the heavy liquid of fine material produced by attrition of the solid materials under treatment, by removing and purifying any heavy liquid or suspension attached to the discharged products from the separating vessel and returning the cleaned heavy liquid to the circuit. In accordance with a further feature of this invention, the attached heavy liquid or suspension removed from the material discharged from the separating vessel can be disposed of without cleaning and an equivalent amount of fresh heavy liquid or suspension solid is supplied to the separating vessel for make-up purposes. This feature is of particular advantage in cases where the solid materials to be separated comprise the same material as is used for making the heavy liquid or suspension. Thus in the case of lead ores, when the heavy liquid used is an aqueous galena suspension, a portion of the lead recovered as a sink or concentrate product of the separating process may be further cleaned and the resulting cleaned galena be fed to the separating vessel, so that galena emanating from the ore-treating mill is used for make-up purposes in the separating vessel. The galena discharging with and removed from the material discharged from the separating vessel contains a certain amount of impurity such as calcium carbonate, but the proportion of the latter is very small, so that such galena is a saleable product, or can be mixed with the main separated galena, without cleaning.

In order to enable the invention to be readily understood reference is directed to the accompanying drawings in which:

Figure 1 is an elevation, partly in section, of one example of ore separating apparatus in accordance with these improvements.

Figure 2 is an end elevation viewed from the left-hand side of Figure 1,

Figure 3 is a fragmentary sectional elevation to a larger scale illustrating spreading means for the inlets.

Figure 4 is a section on the line IV—IV of Figure 3 and

Figure 5 is a diagram illustrating a modification.

In Figures 1 and 2, $a$ is a separating vessel of downwardly tapering form, rectangular in plan, and having a shallow vertically-sided top part $b$ where feed of ore and removal of tailings or float material takes place. The crushed ore, which may have been preliminarily freed from fine material, is fed to one end of the part $b$ by a chute $c$ and distributed by a rotary vane device $d$. The tailings are removed by an endless rake device $e$ from the other end of the part $b$ and are suitably passed over a draining screen $f$ to a discharge chute $g$. The concentrates sinking in the vessel $a$ pass to the casing $h$ of a concentrates elevator, which is preferably a bucket conveyor $k$ of continuous type, and from this casing they are discharged through the chute $l$.

The heavy liquid is led to the separating vessel $a$ by a system of pipes $m$ which terminate in horizontal rows of inlets at different levels in the tapering part of the vessel. As the object of this arrangement is to obtain as even as possible flow of upward current throughout the depth and cross-section of the body of heavy liquid it is essential to have inlets at several levels, in no case less than two, and the levels must extend to the lower part of the vessel. As shown, there is a row of two inlets on either side of the vessel at a level just below mid-way of the depth of the tapering part, and another row of two inlets $o$ on either side of the vessel at a level nearer to the top of the tapering part. In some cases there may be another inlet nearer the bottom of the vessel $a$. Generally, however, this lower part of the vessel is occupied by concentrates so that a further inlet there is unnecessary. It will be noticed from Figure 1 that the inlets $o$ of the upper rows are spaced farther apart than the inlets $n$ in the lower rows so as to allow for the increasing cross-section of the vessel. For the same purpose an extra inlet may be provided in each upper row, centrally between the inlets $o$, if necessary. As shown clearly in Figures 3 and 4, the inlet nozzles suitably slope downwardly and open into the separating vessel beneath plates or shrouds, such as $p$, which are disposed across the vessel from end to end as seen in Figure 1 and extend downwardly at an incline from the side walls of the vessel as seen in Figure 4. These shrouds, which are shown broken away in Figure 3, serve to spread the liquid before it enters the body of liquid proper from beneath the shrouds *p* and their action may be assisted by inclined plates *r* disposed beneath each inlet. As a result the liquid is very evenly distributed in the separating vessel.

For supplying the pipes *m* a compartmental tank or casing *s* is employed. This is shown with three compartments *t*, *u* and *v*, the first, which is at the highest level, serving the pipes for the upper heavy-liquid inlets *o*, the third serving the pipes for the lower inlets *n*, and the middle one *u* being for return of surplus liquid. The bottom of the compartment *t* is elevated with respect to the bottom of the compartment *v* by a distance approximately equal to the difference in level of the two sets of inlets *n*, *o* so that the pipes *m* may contain columns of substantially uniform height with respect to the inlets. However, as the effective liquid heads of the columns in pipes *m* is relative to the upper surface of the liquid in vessel *a*, the pipe *m* leading from compartment *t* will have a higher head and, other conditions being equal, will introduce more liquid into the vessel *a*. In order to control the liquid heads of pipes *m* and, thus, the quantities of liquid introduced to vessel *a* at the several levels, heavy liquid is distributed to the several compartments by a swingable plate device comprising a pair of plates *w* depending from a common axis *x* disposed directly below the pipe *y* supplying liquid to the tank *s*. These plates are adjustable on their axis from outside the tank by screw-handles *z* so that heavy liquid from the pipe *y* may be directed in desired quantities to the outer compartments *t*, *v*, the remainder passing to the middle compartment *u*. A distributing device or valve of this nature is not liable to become clogged by suspended solids in the heavy liquid and the swingable plates *w* can be readily adjusted, so that they just keep the pipes *m* full. The tank or casing *s* is fed from a stabilising tank or vessel 1 to which heavy liquid may be supplied from the tank 2 by a sludge pump 3 and pipe line 4. Or as an alternative, or in addition, there may be a separate stock tank and mixer (not shown) for supply of heavy liquid to the tank or vessel 1. This tank 1 may be fitted with a stirrer 5 and stabilising medium may be introduced into it for incorporation in the heavy liquid. The hinges at *x* in the tank *s* may be shielded from the liquid entering at *y*, by a deflector device 6.

If desired, pipes may be provided at 7 for inlet of compressed air into the bottom of the separating vessel *a* and elevator casing *h* to periodically loosen the sink material and thus facilitate its removal by the elevator *k*. The latter may deliver the concentrates to any suitable point, if desired by way of a screen placed below the chute *l*. The compressed-air supply at 7 may be substituted by a supply of heavy liquid but in either case the supply of air or liquid must be controlled so as not sensibly to interfere with the desired separating conditions. Overflow weirs 8 may be provided on the separating vessel *a* and the elevator casing *h* for controlling the level of liquid therein and liquid overflowing from these weirs and draining from the tailings and concentrates screens may be delivered as by pipes 9 to an impact screen 10 for removal of solid matter. The surplus heavy liquid from the compartment *u* of the tank *s* may also be led to the impact screen 10. The liquid passes through the screen 10 to the tank 2 so that all overflow and drainage liquid can be kept in the system.

In the separating operation, the horizontally distributed supply of heavy liquid provided by the rows of inlets *n*, *o* at different levels, imposes a slight upward current throughout the body of liquid in the separating vessel *a* and as effective control of the liquid supply is provided for by the distributing valve device *w*, *z* this current may be caused to operate very uniformly throughout the liquid body. The control must, of course, be exercised in such a way as to preserve in the liquid body the static quality requisite for the sink-and-float separation.

The tailings delivered by the chute *g* may be washed to remove any suspension solids which they may have gathered from the heavy liquid, and the washed-out solids may be led with the wash liquid to a thickener and/or a filter, and from thence be led to a flotation device for cleaning and finally to the heavy liquid stock tank and mixer, or to the tank 2, for return to the separating circuit. Alternatively, the wash water containing these suspension solids may be merely thickened and the solids filtered and disposed of with the ordinary mill concentrates from the elevator *k* as a market product.

According to the modification illustrated by Figure 5, the concentrates delivered by the elevator *k* may be led from the chute *l* (for example after passing a rotary screen 13), to crushing rolls 14 for further breaking up and then be taken over a washing screen 15 to a jig washer 16. The latter may provide a middlings product which is fed to a ball mill 17 and a classifier 18 and thence to a thickener 19. The settled discharge from this thickener is taken to a flotation device 20 in which it is separated into desirable constituents.

This modification is of particular advantage in cases where the raw ore consists of or comprises material of the same nature as the solid medium used for making the heavy liquid. For instance, if lead sulphide ore is being treated, using an aqueous galena and talc suspension for the heavy liquid, the flotation device 20 separates from the product of the thickener 19 lead sulphide from zinc sulphide and other impurity. The amount of lead sulphide obtainable in this way may be quite sufficient and suitable for supply to the separating vessel to take the place of the fraction of impure galena removed for cleaning and normally returned to such vessel after cleaning to overcome thickening of the liquid therein. In the present invention the impure galena can be disposed of without cleaning as its content of calcium carbonate or other gangue material is not enough to decrease its saleable value. The clean galena from the flotation cell 20 may be passed through a ball mill and classifier to the heavy liquid stock tank and mixer or to the tank 2 and thence by pump to the separating vessel.

I claim:

1. Apparatus for the separation of solid materials of different specific gravities by sink-and-float method, comprising a separating vessel for containing a body of heavy liquid, means for feeding solid materials to said vessel for separation, means for removing separated products of such materials from said vessel, inlets for heavy liquid disposed on the wall of said vessel at a plurality of levels below the feed entry for solid materials, said levels being in both the upper and lower halves of said vessel, means for continuously supplying heavy liquid to said inlets so that both halves of the vessel are supplied with said liquid, plates sloping downwardly and away from said wall from a point above to a point below said inlets for spreading said supply of heavy liquid and inclined plates mounted in the space between the downwardly sloping plates and said wall and with the apex of the plates adjacent and below an inlet for assisting the spreading action.

2. Method for the separation of solid materials of different specific gravities in accordance with specific gravities alone according to the sink-and-float principle, comprising feeding said solid materials to the upper part of a downwardly tapering, quiescent body of heavy liquid and imposing on said body of liquid a slight upward current of substantially uniform strength throughout the depth and cross-section of the separation zone of said body and substantially just sufficient to neutralize downward drag effect and cross currents induced by fall of heavier particles through the liquid, by continuously and uniformly admitting heavy liquid to said body of liquid at a plurality of levels below the point of feed of solid materials at points horizontally distributed at each of said levels, the volume admitted at each level depending upon the increase of cross-sectional area of the body of liquid over that at the next lower level of admission, so that the rate of upward movement in the tapering body of liquid is substantially the same at all levels.

3. Apparatus for the separation of solid materials of different specific gravities in accordance with specific gravities alone according to the sink-and-float principle, comprising walls forming a downwardly tapering separating vessel for containing a substantially quiescent body of heavy liquid, means for feeding solid materials at the upper end of said vessel, means for removing separated products of said materials from the upper and lower ends of said vessel, inlets for heavy liquid disposed in the upper and lower halves of said vessel at a plurality of levels below the feed entry for said materials and horizontally distributed at each level, and means for continuously and uniformly supplying heavy liquid to said inlets in quantities in accordance with the increase in cross-sectional area of the vessel over that at the next lower level of admission, so that the rate of upward movement in the vessel is substantially the same at all levels in the separating zone and just sufficient to counteract the drag and cross-current effect of the heavy material falling through the liquid body, so as to counteract the tendency of the liquid to become heavier toward the bottom in operation, and thus maintain the specific gravity of the liquid uniform, said liquid inlets having means for enlarging the area of flow of the liquid entering the vessel to minimize incidental currents so as not to interfere with the general upward motion of the body of liquid, said vessel being free of devices tending to disturb the quiescence of the body of liquid.

4. Apparatus for the separation of solid materials of different specific gravities in accordance with specific gravities in accordance with specific gravities alone according to the sink-and-float principle, comprising walls forming a downwardly tapering separating vessel for containing a substantially quiescent body of heavy liquid, means for feeding solid materials at the upper end of said vessel, means for removing separated products of said materials from the upper and lower ends of said vessel, inlets for heavy liquid disposed in both the upper and lower halves of said vessel at a plurality of levels below the level of feed of the materials to be separated and horizontally distributed at each level, and means for continuously admitting liquid to said body through said inlets in relative quantities depending on the increase of cross-sectional area upwardly so as to maintain a uniform rate of upward movement of the liquid in the separation zone of said body to counteract cross-currents and drag effects of the heavy material falling through said body of liquid and to maintain the specific gravity of the liquid uniform, said inlets having means for spreading the liquid being admitted to said body transversely at the level of entry and means for shielding the body of liquid from the dynamic effect of the entering liquid until its flow area has become so large and its velocity so low as not to disturb the general quiescence of the body of liquid, said vessel being free of devices tending to disturb the quiescence of the body of liquid.

5. Apparatus for the separation of solid materials of different specific gravities in accordance with specific gravity alone according to the sink-and-float principle, comprising downwardly converging walls forming a separating vessel for containing a substantially quiescent body of heavy liquid, means for feeding solid materials at the upper end of said vessel, means for removing separated products of said materials from the upper and lower ends of said vessel, inlets for heavy liquid disposed in the upper and lower halves of said vessel at a plurality of levels below the feed entry for said materials and horizontally distributed at each level, means for continuously applying a heavy liquid column of greater height to the inlets at a higher level than to those at a lower level to introduce more liquid at the higher level in accordance with the upwardly increasing cross-sectional area of the vessel to produce a slight upward movement of the liquid in the separation zone just sufficient to counteract drag effect and cross-currents produced by fall of heavy material, receptacles at different levels in connection with the upper ends of said columns, adjustable means for deflecting liquid to said receptacles, said inlets having means for spreading the liquid being admitted to said body transversely at the level of entry, and means for shielding the body of liquid from the dynamic effect of the entering liquid until its flow area has become so large and its velocity so low as not to disturb the general quiescence of the body of liquid, said vessel being free of devices tending to disturb the quiescence of the body of liquid.

ANDREW PEARSON.